US009968225B2

(12) United States Patent
Andresen

(10) Patent No.: US 9,968,225 B2
(45) Date of Patent: May 15, 2018

(54) COMBINED BEACH TOWEL AND FOOT BATH

(71) Applicant: Summer Morgan Andresen, Malibu, CA (US)

(72) Inventor: Summer Morgan Andresen, Malibu, CA (US)

(*) Notice: Subject to any disclaimer, the term of this patent is extended or adjusted under 35 U.S.C. 154(b) by 128 days.

(21) Appl. No.: 14/992,574

(22) Filed: Jan. 11, 2016

(65) Prior Publication Data

US 2017/0196410 A1  Jul. 13, 2017

(51) Int. Cl.
| | |
|---|---|
| *A47K 3/062* | (2006.01) |
| *B65D 85/00* | (2006.01) |
| *A47G 9/06* | (2006.01) |
| *F16B 1/00* | (2006.01) |
| *B65D 1/12* | (2006.01) |
| *B65D 25/32* | (2006.01) |
| *A47K 10/02* | (2006.01) |

(52) U.S. Cl.
CPC .............. *A47K 3/062* (2013.01); *A47G 9/062* (2013.01); *B65D 1/12* (2013.01); *B65D 25/32* (2013.01); *B65D 85/70* (2013.01); *F16B 1/00* (2013.01); *A47K 10/02* (2013.01); *F16B 2001/0028* (2013.01)

(58) Field of Classification Search
CPC ........ A47K 3/062; A47K 10/02; A47G 9/062; A47D 15/003; F16B 2001/0028
USPC .......... 296/225; 5/417–420, 655.3, 945, 651, 5/636; 4/622, 588, 574.1, 627; 383/4; 190/2; 224/156
See application file for complete search history.

(56) References Cited

U.S. PATENT DOCUMENTS

| | | | | |
|---|---|---|---|---|
| 1,222,563 A | * | 4/1917 | Rosenberg | A47G 9/062 5/419 |
| 1,644,402 A | * | 10/1927 | Rosswinkle | A47C 7/383 297/397 |
| 4,726,084 A | * | 2/1988 | Keserovich | A47G 9/062 5/417 |
| 5,022,107 A | * | 6/1991 | Knotts | A47C 1/146 5/419 |
| 5,110,219 A | * | 5/1992 | Lopes | A45C 3/10 190/2 |
| 5,206,964 A | | 5/1993 | Wilson, Sr. | |
| 5,429,588 A | * | 7/1995 | Young | A61F 5/0127 36/28 |
| 5,644,807 A | * | 7/1997 | Battistella | A45C 3/10 5/417 |
| 5,895,118 A | | 4/1999 | Hensley | |
| 7,665,164 B2 | | 2/2010 | Le Gette et al. | |

(Continued)

FOREIGN PATENT DOCUMENTS

| | | | | |
|---|---|---|---|---|
| FR | 2974487 A1 | * | 11/2012 | ............... A45F 3/00 |
| GB | 2521427 A | * | 6/2015 | ............. A47K 3/062 |

OTHER PUBLICATIONS

STIC Search report.*

(Continued)

*Primary Examiner* — Andrew Perreault
(74) *Attorney, Agent, or Firm* — Leason Ellis LLP

(57) ABSTRACT

A beach accessory includes a towel that has a first fastener and an inflatable foot bath that is separate from the towel. The inflatable foot bath includes a second fastener that is configured to mate with the first fastener for detachably attaching the inflatable foot bath to the towel.

20 Claims, 4 Drawing Sheets

(56) References Cited

U.S. PATENT DOCUMENTS

| | | | |
|---|---|---|---|
| 8,863,334 B2* | 10/2014 | Gibbons | A47C 20/025 5/631 |
| 8,914,927 B1* | 12/2014 | Leach | A47D 11/007 5/417 |
| 2005/0206208 A1* | 9/2005 | Deering | A47C 7/425 297/397 |
| 2007/0017027 A1* | 1/2007 | Bowman | A47G 9/062 5/417 |
| 2012/0210594 A1* | 8/2012 | Heyman | A47K 10/02 34/283 |

OTHER PUBLICATIONS

Thibaut, Kyle. "Say Hi-Sun to the Towel/Speaker." TechCrunch. N.p., Jul. 1, 2010. Web. <http://techcrunch.com/2010/07/01/say-hi-sun-to-the-towelspeaker/>.

* cited by examiner

COMBINED BEACH TOWEL AND FOOT BATH

TECHNICAL FIELD

The present invention relates to beach accessories and in particular relates to a beach towel that includes an attachable bath for cleaning the feet of the user prior to leaving the beach.

BACKGROUND

One of the most common beach accessories is a beach towel. A traditional beach towel for use at the beach is typically larger than a normal household towel so that a person can use it to lie on the sand. One of the challenges of going to the beach is the sand itself. Sand is an abrasive and as beachgoers understand sand readily sticks to wet sink.

Many people find it very difficult to put on beach footwear without having sand sticking to the calves and feet and further, most beachgoers dislike getting into a clean car with a fine layer of sticky, salty sand on one's calves and feet. While many people try to enter the ocean in order to do a final rinse, the difficulty is that the beachgoer has to walk across the sand, thereby causing sand to stick back onto the wet skin, e.g., wet feet.

There is therefore a need for an improved solution as to how to clean a person's feet from sand at the beach. The present invention addresses and provides such solution.

BRIEF DESCRIPTION OF THE DRAWING FIGURES

DETAILED DESCRIPTION OF CERTAIN EMBODIMENTS

Figure 1:
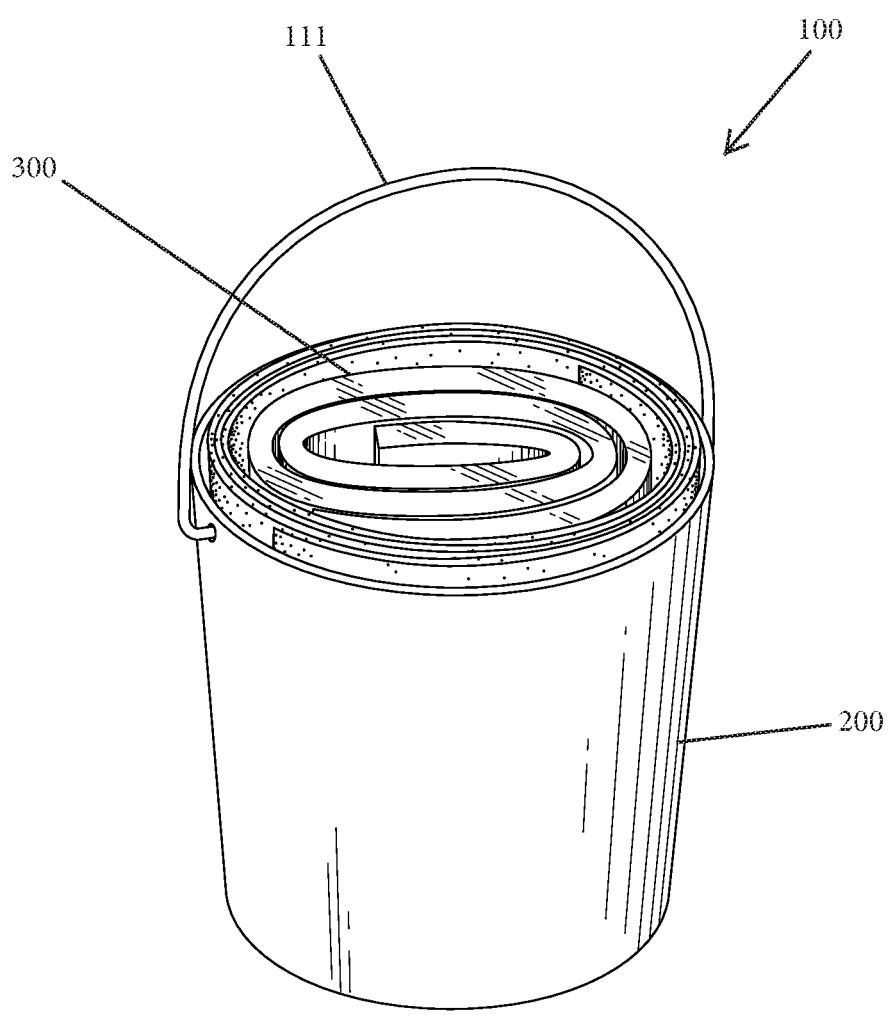
FIG. 1 is a side perspective view of a container with a beach accessory of the present invention.
Figure 2:
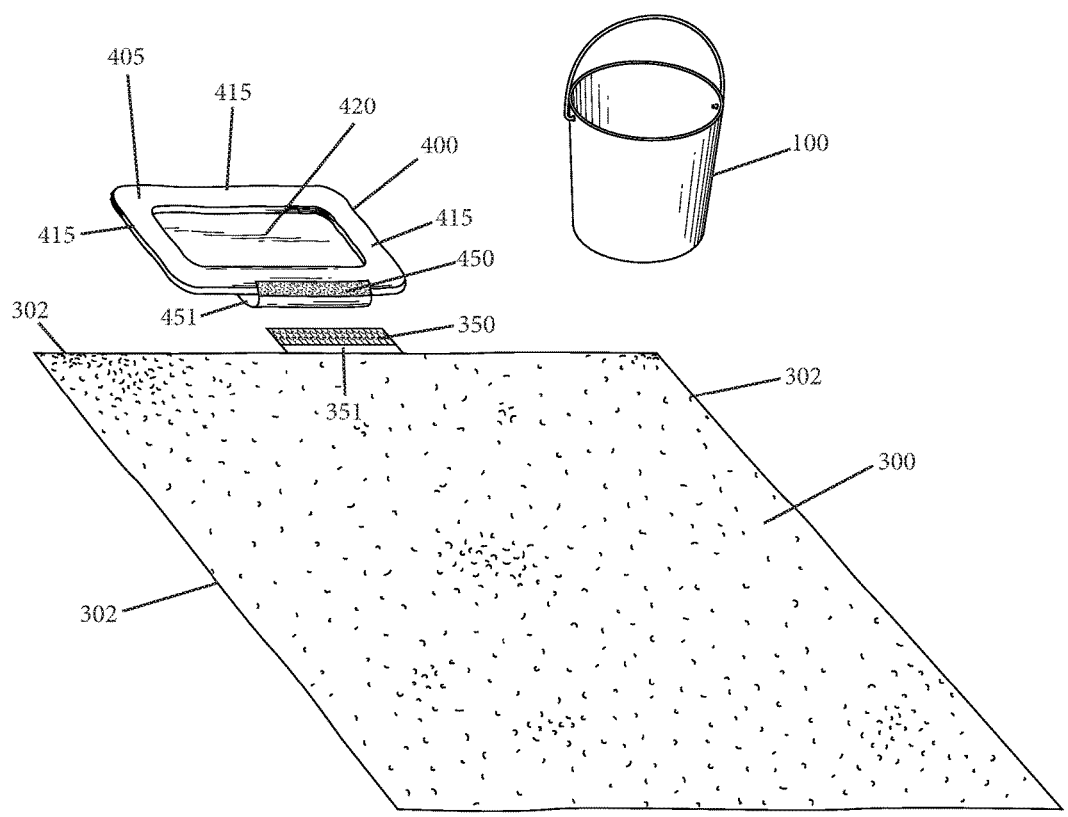
FIG. 2 is an exploded perspective view of the beach accessory in an unassembled condition.
Figure 3:
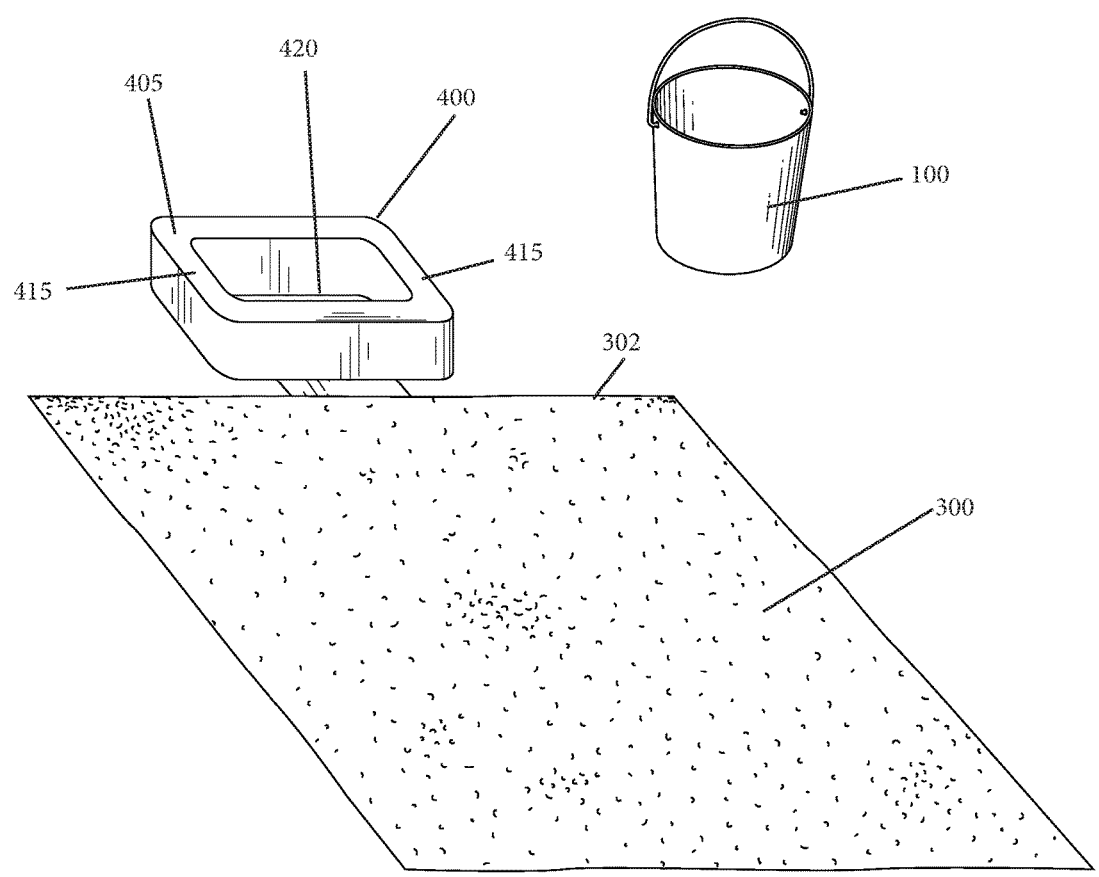
FIG. 3 is an exploded perspective view of the beach accessory in an assembled condition.

FIGS. 1-3 illustrate a beach accessory 100. The beach accessory 100 includes a container or receptacle 200; a towel or blanket 300 and a foot bath 400.

The container 110 can be in the form of beach bucket or pail. The container 110 can come into any number of different shapes and can be formed of different materials, such as plastics or metal. The container 110 can also include a handle 111 or the like to make it easier to carry the container 110. In the illustrated embodiment, the container 110 is in the form of a round bucket or pail. As described herein, the container 110 is preferably shaped and sized so that it can contain and carry the towel 300 and foot bath 400.

The towel 300 is formed of conventional materials, such as a fabric, such as cotton or synthetic fabrics. The towel 300 can also come in any number of different shapes and sizes. For example, the towel 300 can be formed to have a circular shape (as shown) or a rectangular or square shape or some other shape. In the illustrated embodiment, the towel 300 has a circular shape defined by a peripheral (circumferential) edge 302. The towel 300 can have edging that has a different construction than the rest of the main body of the towel 300.

The foot bath 400 is designed to be in the form of a bath that can hold a liquid, e.g., water (ocean water), that can be used to rinse a person's body and more particularly, can be used to rinse the sand from a person's body, such as the calves and/or feet. The foot bath 400 preferably has a storage state and an in-use state. In the storage state, the foot bath 400 has a more compact condition and is meant to be stored with the folded towel 300 and conversely, in the in-use state, the foot bath 400 is configured to hold and contain the fluid.

In one preferred embodiment, the foot bath 400 is in the form of an inflatable foot bath. As shown in FIGS. 2-3, the foot bath 400 is positionable between a deflated state (FIG. 2) and an inflated state (FIG. 3). In the deflated state, the foot bath 400 is collapsed and can be freely rolled into a more compact form. As described herein, when the foot bath 400 is inflated (e.g., with air), the foot bath 400 assumes a greater footprint. The foot bath 400 includes an air inlet 405 with a traditional valve structure and a plug. As with inflatable toys, like beach boys, to inflate the foot bath 400, the user simply blows air through the air inlet 405 causing inflation thereof.

More specifically, the foot bath 400 can be in the form of a first (upper) layer of material and a second (lower) layer of material. The two layers are sealed along a perimeter seam so as to define a peripheral air compartment which is defined by one or more peripheral side walls 415. Air is received within the peripheral air compartment 410 to cause inflation thereof. Within (between) the peripheral air compartment 410, a central recessed fluid compartment/chamber 420 is formed and is configured to hold fluid, such as water (ocean water, etc.). This central recessed fluid compartment 420 is configured for placement of a person's foot or feet. When the foot bath 400 has a circular shape, the peripheral air compartment 410 has an annular shape and the central recessed fluid compartment 420 has a circular shape. When the foot bath 400 has a square shape, the peripheral air compartment 410 likewise has a square shape.

It will be understood that a floor of the central recessed fluid compartment 420 is recessed relative to upper edges of the one or more side walls 415 when the foot bath 400 is inflated. In one embodiment, there is a small air compartment below the floor of the central recessed fluid compartment 420 which when inflated provides a small air cushion below the floor. In an alternative embodiment (as shown), there is no air compartment below the floor of the central recessed fluid compartment 420 and the floor is disposed directly against the ground (sand).

The height of the inflated peripheral air compartment 410 can vary; however, it is of sufficient size to allow a sufficient amount of water to be held and contained within the central recessed fluid compartment 420 for cleaning a person's foot or feet.

In accordance with the present invention, the foot bath 400 is attachable and detachable from the towel 300 using a pair of complementary first and second fasteners 450, 350, respectively, or the like. The first fastener 450 is associated with the foot bath 400 and the second fastener 350 is associated with the towel 300. The first fastener 450 is disposed along one edge of the towel 300 and similarly, the second fastener 350 is disposed along one edge of the foot bath 400.

In some embodiments, the first fastener 450 can be provided on a tab or extension 451 that extends outwardly from the peripheral edge of the foot bath 400. For example, the extension 451 can be in the form of a polymer film (non-inflatable) that extends outwardly from the foot bath 400. The first fastener 450 can be any number of different types of fasteners that are suitable for use in the present application. For example, the first fastener 450 can be in the form of a button, a snap, a hook and loop type fastener, a zipper part, etc. The first fastener 450 should be of a type that can withstand exposure to sand, water and other elements. In the illustrated embodiment, the first fastener 450 is a piece of hook and loop material.

In some embodiments, the second fastener 350 can be provided on a tab or extension 351 that extends outwardly from the peripheral edge of the towel 300. For example, the extension 351 can be in the form of fabric piece that extends outwardly from the peripheral edge of the towel 300. The second fastener 350 can be any number of different types of fasteners that are suitable for use in the present application. For example, like the first fastener 450, the second fastener 350 can be in the form of a button, a snap, a hook and loop type fastener, a zipper part, etc. The second fastener 350 should be of a type that can withstand exposure to sand, water and other elements. The first and second fasteners 450, 350 are complementary to one another. In the illustrated embodiment, the second fastener 350 is a piece of hook and loop material.

The attachment and subsequent detachment of the foot bath 400 relative to the towel 300 occurs by mating and then separating the first and second fasteners 450, 350. The mating between the first and second fasteners 450, 350 results in the secure attachment of the foot bath 400 to the towel 300.

Figures 4, 5A, 5B, 5C, 5D:
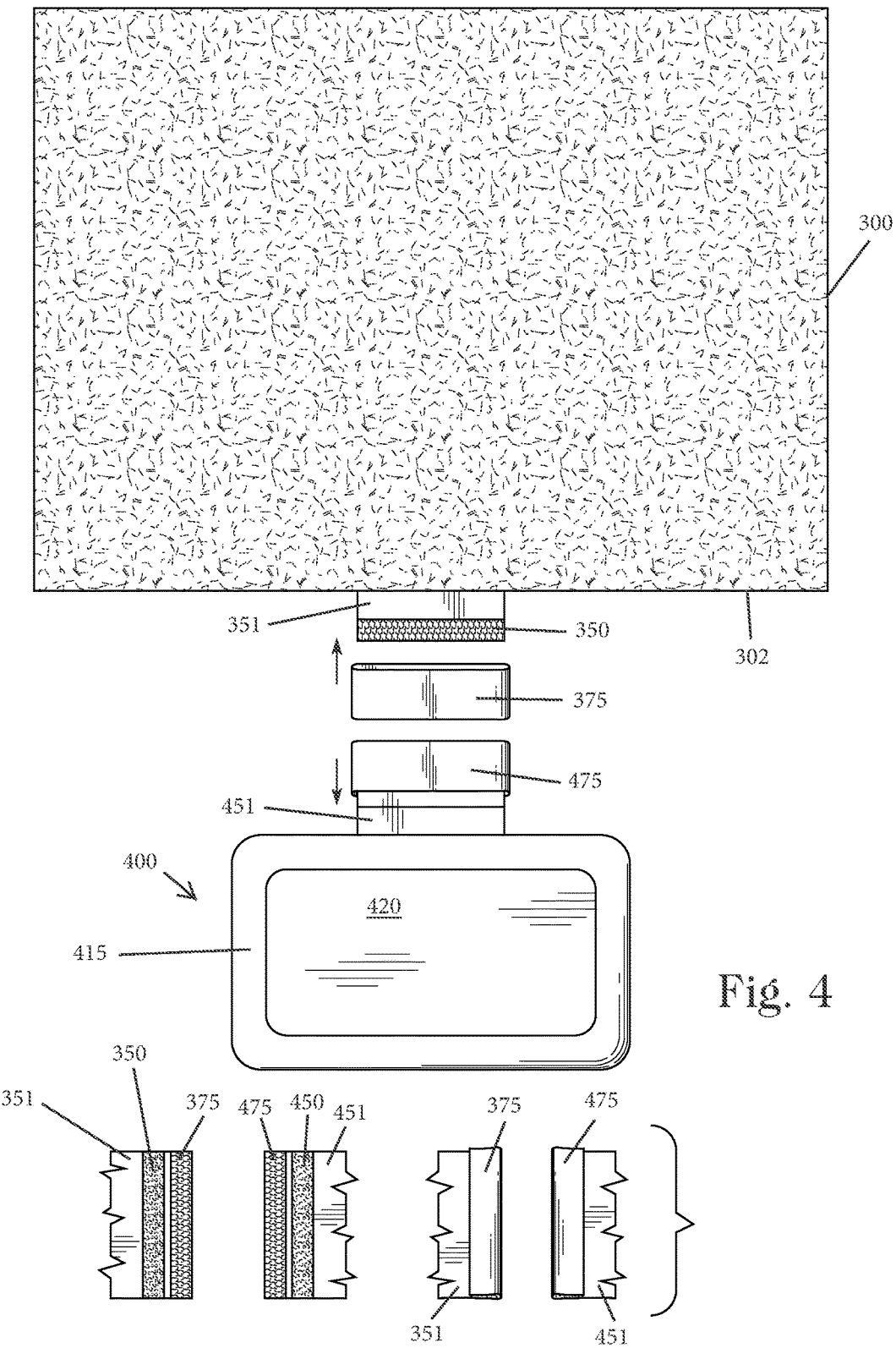
FIG. 4 is a top plan view of the beach accessory showing optional covers.
FIG. 5A shows a first fastener in an uncovered condition.
FIG. 5B shows a second fastener in an uncovered condition.
FIG. 5C shows the first fastener in a covered condition.
FIG. 5D shows the second fastener in a covered condition.

As shown in FIG. 4, a first cover 375 can be provided to cover and protect the second fastener 350 when it is not mated to the first fastener 450. The first cover 375 is sized and configured to be disposed around and cover the first fastener 450. The first cover 375 can be formed in any number of different materials such as a textile or plastic, etc. The first cover 375 has an open interior that receives the second fastener 350. The open interior of the first cover 375 can also include a complementary fastener (such as piece of hook and loop material) to detachably mate with the second fastener 350. Similarly, a second cover 475 is provided to cover and protect the first fastener 450. The second cover 475 can have the same construction as the first cover 375. FIG. 4 shows the second cover 475 fully covering the first fastener 450 and the first cover 375 is shown prior to covering the second fastener 350.

In another embodiment, the covers 375, 475 can be attached to the peripheral edges of the towel 300 and foot bath 400, respectively. In this design, the integral cover can be a piece of fabric that is shaped to define a pocket that receives the respective fastener. The extension of the fastener can be centrally located within the pocket and to protect the fastener, the fastener is simply inverted (folded over itself) and folded into the pocket.

FIGS. 5A-5D show alternative ways for covering and protecting the first and second fasteners 350, 450. As shown in FIG. 5A, the extension 351 which contains the second fastener 350 also includes a distal end cover portion 355 that is disposed immediately adjacent the second fastener 350. Similarly, the extension 351 which contains the second fastener 350 also includes a distal end cover portion 355 that is disposed immediately adjacent the second fastener 350. To cover and protect the second fastener 350, the distal end cover portion 355 mates with the second fastener 350 (FIG. 5C). For example, when the second fastener 350 is in the form of a piece of hook and loop material, the distal end cover portion 355 comprises a piece of hook and loop material that can be folded over on top of the second fastener 350 so as to mate therewith.

As shown in FIG. 5B, the extension 451 which contains the first fastener 450 also includes a distal end cover portion 455 that is disposed immediately adjacent the first fastener 450. Similarly, the extension 451 which contains the first fastener 450 also includes a distal end cover portion 455 that is disposed immediately adjacent the first fastener 450. To cover and protect the first fastener 450, the distal end cover portion 455 mates with the first fastener 450 (FIG. 5D). For example, when the first fastener 450 is in the form of a piece of hook and loop material, the distal end cover portion 455 comprises a piece of hook and loop material that can be folded over on top of the first fastener 450 so as to mate therewith.

It will be appreciated that the present disclosure and figures are merely exemplary in nature and not limiting of the scope of the invention.

What is claimed is:

1. A beach accessory comprising:
   a towel;
   a first fastener coupled to the towel;
   an inflatable foot bath that is separate from the towel, the inflatable foot bath having a center region and a peripheral wall that surrounds and protrudes upwardly from the center region to define a sealed pool area for holding a liquid, wherein the sealed pool area has a planar floor that is positioned for placement directly against a ground surface when the inflatable foot bath is in use; and
   a second fastener coupled to the inflatable foot bath, wherein the second fastener is configured to mate with the first fastener for detachably attaching the inflatable foot bath to the towel.

2. The beach accessory of claim 1, wherein the first and second fasteners are selected from the group consisting of: snaps, zippers, buttons and hook and loop fasteners.

3. The beach accessory of claim 1, wherein the towel includes a first extender protruding outwardly from a peripheral edge of the towel, the first fastener being disposed on the first extender; wherein the foot bath includes a second extender protruding outwardly from a peripheral edge of the foot bath, the second fastener being disposed on the second extender.

4. The beach accessory of claim 1, further including a first cover to cover the first fastener when not in use and a second cover to cover the second fastener when not in use.

5. The beach accessory of claim 4, wherein each of the first and second covers comprises a separate part relative to the first and second fasteners, respectively, that has a hollow interior for receiving the respective first and second fastener.

6. The beach accessory of claim 4, wherein the first cover is integral to the first fastener and the second cover is integral to the second fastener.

7. The beach accessory of claim 3, wherein the first extender has a distal end with the first fastener being spaced from the distal end and a first cover being disposed at the distal end to cover the first fastener when not in use, and wherein the second extender has a distal end with the second fastener being spaced from the distal end and a second cover being disposed at the distal end to cover the second fastener when not in use.

8. The beach accessory of claim 7, wherein the first fastener comprises a first piece of hook and loop material and the first cover comprises another piece of hook and loop material that is selected to mate with and cover the first piece of hook and loop material, and wherein the second fastener comprises a second piece of hook and loop material and the second cover comprises another piece of hook and loop material that is selected to mate with and cover the second piece of hook and loop material.

9. The beach accessory of claim 1, wherein the center region is non-inflatable and the peripheral wall is inflatable.

10. The beach accessory of claim 1, wherein the peripheral wall is inflatable and the center region includes an air compartment below the floor that is inflatable to provide cushioning below the floor.

11. The beach accessory of claim 1, wherein the towel has a rectangular shape and the inflatable foot bath is attached along an edge of one end of the towel.

12. The beach accessory of claim 11, wherein the inflatable foot bath has a shape selected from the group consisting of a circle, oval, square, and a rectangle.

13. The beach accessory of claim 1, wherein the towel is formed of a fabric and the inflatable foot bath is formed of a plastic material.

14. A beach accessory kit comprising:
a towel;
a first fastener coupled to the towel; and
an inflatable foot bath that is separate from the towel, the inflatable foot bath having a center region and a peripheral wall that surrounds and protrudes upwardly from the center region to define a sealed pool area for holding a liquid, wherein the sealed pool area has a planar floor that is positioned for placement directly against a ground surface when the inflatable foot bath is in use;
a second fastener coupled to the inflatable foot bath, wherein the second fastener is configured to mate with the first fastener for detachably attaching the inflatable foot bath to the towel; and
a container, wherein the container is configured to receive and contain the towel and inflatable foot bath each in a rolled state.

15. The beach accessory of claim 14, wherein the container comprises a bucket.

16. The beach accessory of claim 14, wherein the first and second fasteners are selected from the group consisting of: snaps, zippers, buttons and hook and loop fasteners.

17. The beach accessory of claim 14, wherein the towel includes a first extender protruding outwardly from a peripheral edge of the towel, the first fastener being disposed on the first extender; wherein the foot bath includes a second extender protruding outwardly from a peripheral edge of the foot bath, the second fastener being disposed on the second extender.

18. The beach accessory of claim 14, wherein the center region is non-inflatable and the peripheral wall is inflatable.

19. The beach accessory of claim 14, wherein the peripheral wall is inflatable and the center region includes an air compartment below the floor that is inflatable to provide cushioning below the floor.

20. A beach accessory comprising:
a towel having a first extender attached to a peripheral edge of the towel, wherein the first extender protrudes outwardly and away from the peripheral edge of the towel;
a first fastener disposed on one side of the first extender, wherein the first fastener is spaced from a distal end of the first extender;
a first cover disposed at the distal end of the first extender and adjacent to the first fastener, wherein the first cover is adapted to cover the first fastener when not in use;
an inflatable foot bath having a second extender attached to a peripheral edge of the foot bath, wherein the second extender protrudes outwardly and away from the peripheral edge of the foot bath;
a second fastener disposed on one side of the second extender, wherein the second fastener is spaced from a distal end of the second extender and is configured to mate with the first fastener for detachably attaching the foot bath to the towel; and
a second cover disposed at the distal end of the second extender and adjacent to the second fastener, wherein the second cover is configured to cover the second fastener when not in use.

* * * * *